US010041794B1

(12) United States Patent
Moberg et al.

(10) Patent No.: US 10,041,794 B1
(45) Date of Patent: Aug. 7, 2018

(54) SITE POSITIONING SYSTEM FOR AN UNDERGROUND MACHINE

(71) Applicant: Caterpillar Global Mining Europe GmbH, Lünen (DE)

(72) Inventors: Carl Moberg, Dunlap, IL (US); Thomas Temmann, Werne (DE); Martin Teiner, Hamm (DE); Paul Kornev, Herne (DE); Frank Kühnemund, Dresden (DE); Brian Rockwood, Washington, IL (US); Matt Palmer, Peoria, IL (US); Brent Duppong, Cambridge, IA (US); Björn-Andre Hühn, Essen (DE)

(73) Assignee: Caterpillar Global Mining Europe GmbH, Lünen (DE)

( * ) Notice: Subject to any disclaimer, the term of this patent is extended or adjusted under 35 U.S.C. 154(b) by 0 days.

(21) Appl. No.: 15/473,248

(22) Filed: Mar. 29, 2017

(51) Int. Cl.
*G01C 15/00* (2006.01)
*E21D 9/00* (2006.01)

(52) U.S. Cl.
CPC ............. *G01C 15/006* (2013.01); *E21D 9/00* (2013.01); *G01C 15/00* (2013.01)

(58) Field of Classification Search
None
See application file for complete search history.

(56) References Cited

U.S. PATENT DOCUMENTS

| 3,130,495 | A | * | 4/1964 | Schulte | G01C 15/00 33/1 H |
| 3,817,624 | A | * | 6/1974 | Martin | G01C 15/002 356/138 |
| 4,053,182 | A | * | 10/1977 | Nelson | E21C 37/06 175/103 |
| 4,261,617 | A | * | 4/1981 | Droscher | E21D 9/003 175/45 |
| 4,732,472 | A | * | 3/1988 | Konig | G01C 15/002 356/152.3 |

(Continued)

FOREIGN PATENT DOCUMENTS

| CN | 104295297 A | 1/2015 |
| CN | 104764434 A | 7/2015 |

*Primary Examiner* — Kara E Geisel
*Assistant Examiner* — Jarreas C Underwood (57) ABSTRACT

A site positioning system for an underground machine includes a first prism coupled with the underground machine, a second prism operatively coupled with the underground machine, a primary total station, and a reference prism may be in communication with the primary total station. A positioning controller is configured to control, responsive to receiving a High Accuracy Machine Position mode, the primary total station to monitor the first prism and the second prism and transmit a first prism position and a second prism position, respectively, to the positioning controller; control, responsive to receiving a Low Accuracy Machine Position mode, the primary total station to monitor the first prism and transmit the first prism position to the positioning controller; determine, responsive to receiving a Reference Prism Measurement mode, whether a reference prism measurement has been completed, and present positioning information for the machine based on one or more of the prism positions.

20 Claims, 3 Drawing Sheets

(56) References Cited

U.S. PATENT DOCUMENTS

| | | | | | |
|---|---|---|---|---|---|
| 5,822,050 | A | * | 10/1998 | Ohtomo | E21D 9/004 356/138 |
| 6,369,755 | B1 | * | 4/2002 | Nichols | G01C 15/002 342/357.52 |
| 6,480,289 | B1 | * | 11/2002 | Shimomura | E21D 9/004 356/614 |
| 6,844,923 | B2 | * | 1/2005 | Weithe | E21D 9/004 356/4.01 |
| 9,292,017 | B2 | * | 3/2016 | Preston | G05D 1/0212 |
| 9,797,719 | B2 | * | 10/2017 | Nishita | G01C 3/08 |

\* cited by examiner

SITE POSITIONING SYSTEM FOR AN UNDERGROUND MACHINE

TECHNICAL FIELD

The present disclosure relates generally to positioning systems for machines and, more particularly, relates to site positioning systems for such underground machines.

BACKGROUND

Some underground industries such as, but not limited to, underground mining and underground construction, utilize underground machines that operate in a tunnel environment. In such environments, the work site is typically a confined space with low visibility. Moreover, some operations require accurate positioning of the underground machine, but being in the underground tunnel environment, however, obstructs the underground machine from utilizing the above-ground Global Positioning System (GPS) satellite network.

Although GPS is generally ineffective for such underground environments, other efforts have been developed to facilitate the positioning of the underground machines. For example, a total station theodolite may be arranged at the underground worksite for determining position data from a prism located on the underground machine. The position data may then be utilized to assist in maneuvering the underground machine to a desired position. Often times, the total station theodolite is continuously monitoring and communicating with the prism to read the position data, which may unnecessarily shorten the battery life of the total station theodolite.

Chinese Patent No. CN104764434 (the '434 patent) discloses a total station that monitors three prisms in dynamic real-time to provide instantaneous coordinates of a machine fuselage. The coordinate data is analyzed to determine the spatial position of the center of the machine fuselage and compare with the design position.

SUMMARY

In accordance with an aspect of the disclosure, a site positioning system for an underground machine is provided. The site positioning system may include a first prism operatively coupled with the underground machine. A second prism may be operatively coupled with the underground machine. A primary total station may be in communication with the first prism and the second prism. A reference prism may be in communication with the primary total station. A positioning controller may be in communication with the primary total station and may be configured to: control, responsive to receiving a High Accuracy Machine Position mode request signal, the primary total station to monitor the first prism and the second prism and to transmit a first prism position and a second prism position, respectively, to the positioning controller; control, responsive to receiving a Low Accuracy Machine Position mode request signal, the primary total station to monitor the first prism and to transmit the first prism position to the positioning controller; determine, responsive to receiving a Reference Prism Measurement mode request signal, whether a reference prism measurement has been completed within a predetermined time period, and present positioning information for the machine based on one or more of the first prism position, the second prism position, or the reference measurement.

In accordance with another aspect of the disclosure, a machine is provided. The machine may include a first prism and a second prism operatively coupled with the underground machine. A positioning controller may be operatively coupled with the machine and may be in communication with a primary total station located off-board of the machine. The primary total station may be in communication with the positioning controller. The positioning controller may be configured to present positioning information for the machine based on one or more a first prism position, a second prism position, or a reference prism measurement. The machine controller may be configured to: determine information regarding the machine, the information regarding the machine including information indicating whether a machine mode of the underground machine is in tram, load, or cut, information indicating whether the machine is transitioned to stop, and information indicating whether one of the machine is not being shut down or whether an Automatic Cut cycle of the underground machine is complete; transmit, if the information regarding the machine indicates that the machine mode of the underground machine is in tram, load, or cut and the underground machine is transitioned to stop, a High Accuracy Machine Position mode request signal to the positioning controller, the High Accuracy Machine Position mode request signal being associated with the first prism position and the second prism position; transmit, if the information regarding the machine indicates that the machine mode of the underground machine is in tram, load, or cut and the underground machine is moving, a Low Accuracy Machine Position mode request signal to the positioning controller, the Low Accuracy Machine Position mode request signal being associated with the first prism position; and transmit, if the information regarding the machine indicates that the underground machine is beginning to operate in the Automatic Cut cycle, a Reference Prism Measurement request signal to the positioning controller, the Reference Prism Measurement request signal being associated with the reference prism measurement.

In accordance with yet another aspect of the disclosure, a method for operating a site positioning system for an underground machine is provided. The method may include determining information regarding the machine, the information regarding the machine including information indicating whether a machine mode of the underground machine is in tram, load, or cut, information indicating whether the machine is transitioned to stop, and information indicating whether one of the machine is not being shut down or whether an Automatic Cut cycle of the underground machine is complete. The method may further include monitoring, if the information regarding the machine indicates that the machine mode of the underground machine is in tram, load, or cut and the underground machine is transitioned to stop, a first prism and a second prism of the underground machine for transmitting a first prism position and a second prism position, respectively, to a positioning controller of the site positioning system the first prism position and the second prism position being associated with a High Accuracy Machine Position mode request. The method may further include monitoring, if the information regarding the machine indicates that the machine mode of the underground machine is in tram, load, or cut and the underground machine is moving, the first prism for transmitting the first prism position to the positioning controller, the first prism position being associated with a Low Accuracy Machine Position mode request. Further, the method may further determining, if the information regarding the machine indicates that the underground machine is beginning to operate in the Automatic Cut cycle, whether a reference prism measurement has been completed within a predetermined time period, the reference prism measurement associated with a Reference Prism Measurement request signal. The method may further include presenting positioning information for the machine based on one or more of the first prism position, the second prism position, or the reference prism measurement.

These and other aspects and features of the present disclosure will be more readily understood upon reading the following detailed description when taken in conjunction with the accompanying drawings. Aspects of different embodiments herein described can be combined with or substituted by one another.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
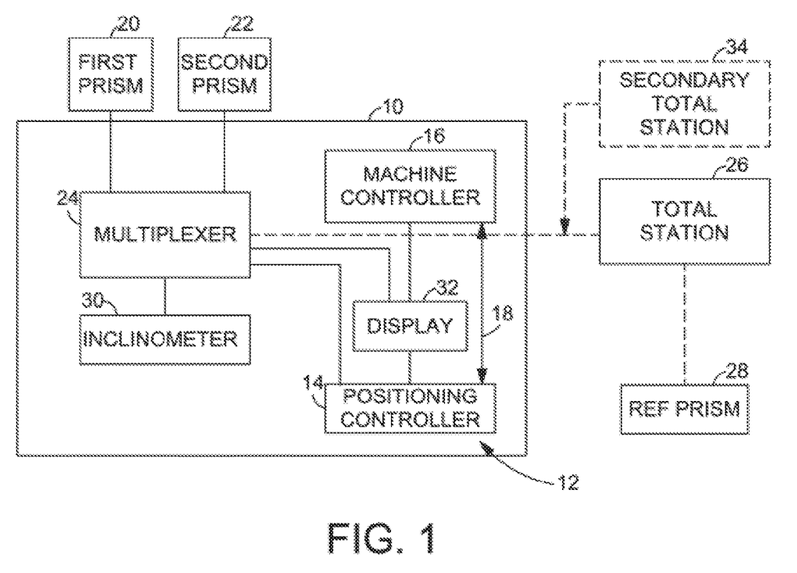
FIG. 1 is a block diagram of an exemplary underground machine and a site positioning system associated therewith, in accordance with an embodiment of the present disclosure.

Referring now to FIG. 1, an exemplary underground machine constructed in accordance with the present disclosure is generally referred to by reference numeral 10. The underground machine 10 may be any type of underground machine utilized in underground mining and underground construction industries, to name a few examples, such as, but not limited to, tunneling machines and cutting units. The underground machine 10 includes a site positioning system 12 for accurate positioning of the underground machine 10 at a worksite. While FIG. 1 and the present disclosure refer to an underground machine as an example, the present disclosure may be applicable to other types machines that may operate outside of the purview some traditional worksites, such as, but not limited to, mining excavators, underground load-haul-dump (LHD) loaders and underground mining trucks, backhoe loaders, skid steer loaders, wheel loaders, material loaders, motor graders, track-type tractors, landfill compactors, excavators, and articulated trucks, to name a few, which are employed at a worksite.

The site positioning system 12 includes a positioning controller 14 in communication with a machine controller 16 of the underground machine 10. The machine controller 16 is configured to control operations of the underground machine 10 such as, but not limited to, machine modes of tram, load, and cut; machine startup and shutdown; and Automatic Cut cycle. The machine modes refer to operations performed by the machine 10, either manually, semi-autonomously, or autonomously (e.g., "tram" may refer to a movement of a machine to a given position, "load" may refer to loading materials on an implement of a machine, and/or "cut" may refer to usage of an implement, or other element of a machine, to cut, dig, break, or otherwise break materials). Further, an "Automatic Cut cycle" may refer to an automated cycle of a machine including one or more processes of cutting, loading, and/or tramming, by the machine 10. The machine controller 16 is in communication with the positioning controller 14 and is also configured to transmit site positioning mode request signals 18 thereto, such as but not limited to High Accuracy Machine Position Mode, Low Accuracy Machine Position Mode, Reference Prism Measurement Mode, and OFF/Standby Mode. The machine controller 16 determines which of the various site positioning mode request signals 18 to transmit to the positioning controller 14 based on particular combinations of control operations controlling the underground machine 10 by the machine controller 16.

Moreover, the site positioning system 12 includes a first prism 20 and a second prism 22. The first prism 20 and the second prism 22 are operatively coupled with the underground machine 10 and are in communication with the positioning controller 14 via a multiplexer 24. Operatively coupled, as defined herein, may refer to any coupling between each of the first and second prisms 20, 22 and the machine 10, such as attachment of the prisms 20, 22 on the machine 10, mounting of the prisms 20, 22 on the machine 10, connecting the prisms 20, 22 via a connecting device, and/or any suitable other systems, methods or devices that allow the prisms 20, 22 to operate with respect to the machine 10. The site positioning system 12 further includes a primary total station 26 in communication with the first prism 20 and the second prism 22. The primary total station 26 is any type of total station theodolite well-known in the industry. The primary total station 26 is also in communication with a reference prism 28 of the site positioning system 12. The reference prism 28 is situated off-board of the underground machine 10 and may be located strategically at the worksite. The first prism 20, the second prism 22, and the reference prism 28 are any type of survey prisms well-known in the industry. The positioning controller 14 is in communication with, and configured to control, the primary total station 26 via the multiplexer 24. The primary total station 26 is configured to monitor each of the first prism 20, the second prism 22, and the reference prism 28 independently, or in any combination thereof, to measure a first prism position, a second prism position, and a reference prism position, respectively. The first prism position, the second prism position, and the reference prism positon are each monitored in three-dimensional measurements, for example, tracking individual x-, y-, and z-coordinates when being used by the positioning system 12. Moreover, the primary total station 26 is configured to transmit the first prism position, the second prism position, and the reference prism position to the positioning controller 14 via the multiplexer 24. In some embodiments, the primary total station 26 communicates wirelessly with the positioning controller 14 via the multiplexer 24.

The site positioning system 12 further includes an inclinometer 30 in communication with the positioning controller 14 via the multiplexer 24. The inclinometer 30 is configured to measure roll and pitch of the underground machine 10 and to transmit roll and pitch data to the positioning controller 14 via the multiplexer 24. The positioning controller 14 is in communication with a display 32, which is also in communication with the machine controller 16.

In some examples, the site positioning system 12 may, optionally, include a secondary total station 34. In such examples, the positioning controller 14 may be in communication with, and configured to control, the secondary total station 34 via the multiplexer 24. Similar to the primary total station 26, the secondary total station 34 may be configured to monitor each of the first prism 20, the second prism 22, and the reference prism 28 independently, or in any combination thereof, to measure the first prism position, the second prism position, and the reference prism position, respectively. In some examples, the primary total station 26 may be configured to selectively monitor the first prism 20 and the secondary total station 34 may be configured to selectively monitor the second prism 22. In the event that one of the primary total station 26 and the secondary total station 34 malfunctions, the other functioning total station is configured to selectively monitor the first prism 20, the second prism 22, and/or the reference prism 28. While the second total station 34 is depicted in FIG. 1, it is certainly not necessary for functionality of the site positioning system 12. Furthermore, any additional or alternative total stations may be utilized in conjunction with the total station 26.

Figure 2:
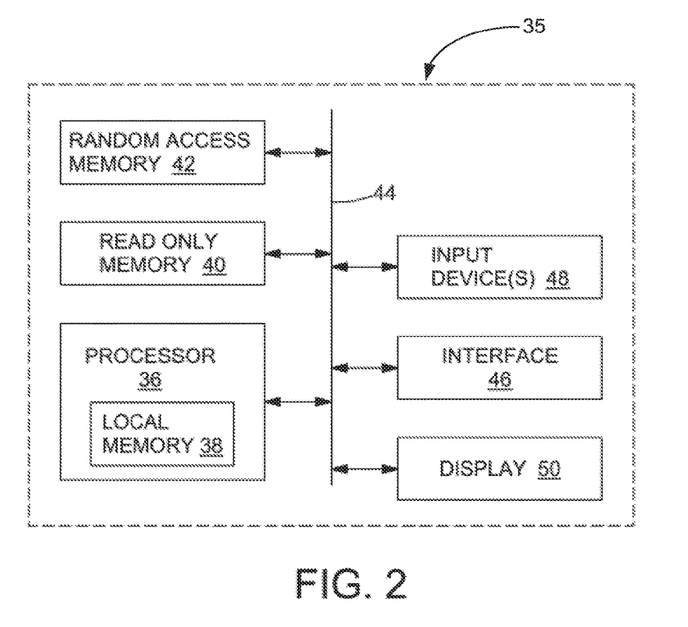
FIG. 2 is a block diagram illustrating components of an exemplary computing device, in accordance with an embodiment of the present disclosure.

FIG. 2 is a block diagram of example components of an exemplary computing device 35, which may be utilized to embody one or more components of the system 12 of FIG. 1 and/or the computing device may be utilized to perform one or more functions of one or more components of the system 12. Particularly, the exemplary computing device 35 or multiple computing devices 35 may be used to embody or perform functions of one or more of the positioning controller 14, the machine controller 16, the primary total station 26, and the secondary total station 34. Further, the exemplary computing device 35 may be capable of executing instructions to realize the disclosed system and methods for positioning the underground machine 10, as described below, and/or the computing device 35 may be capable of executing instructions to perform mode selection, as described below with reference to FIG. 4. The positioning controller 14, the machine controller 16, the primary total station 26, and the secondary total station 34 may each include a processor, such as a processor 36 of the computing device 35, that may be, for example, implemented by one or more microprocessors or controllers from any desired family or manufacturer.

The processor 36 includes a local memory 38 and is in communication with a main memory including a read-only memory 40 and a random access memory 42, via a bus 44. The random access memory 42 may be implemented by Synchronous Dynamic Random Access Memory (SDRAM), Dynamic Random Access Memory (DRAM), RAMBUS Dynamic Random Access Memory (RDRAM) and/or any other type of random access memory device. The read-only memory 40 may be implemented by a hard drive, flash memory and/or any other desired type of memory device.

The computing device 35 may also include an interface circuit 46. The interface circuit 46 may be implemented by any type of interface standard, such as, for example, an Ethernet interface, a universal serial bus (USB), and/or a PCI express interface. One or more input devices 48 are connected to the interface circuit 46 via the bus 44. The input device(s) 48 permit an operator to enter data and commands into the processor 36. The input device(s) 48 may be implemented by, for example, a keyboard, a keypad, a touch screen, a mouse, a track-pad, a trackball, and/or a voice recognition system. For example, the input device(s) 48 may include any wired or wireless device for providing input.

A visual display 50, such as the display 32, is also connected to the interface circuit 46 via the bus 44. The visual display may be implemented by, for example, one or more display devices for associated data (e.g., a liquid crystal display, a cathode ray tube display (CRT), etc.).

As mentioned above the computing device 35 may be used to execute machine readable instructions. For example, the positioning controller 14, the machine controller 16, the primary total station 26, and the total station 34 may execute machine readable instructions to perform the mode selection shown in the block diagram of FIG. 4 and described in more detail below. In such examples, the machine readable instructions comprise a program for execution by a processor such as processor 36. The program may be embodied in software stored on a tangible computer readable medium such as a CD-ROM, a floppy disk, a hard drive, a digital versatile disk (DVD), a Blu-ray™ disk, or a memory associated with the processor 36, but the entire program and/or parts thereof could alternatively be executed by a device other than the processor 36 and/or embodied in firmware or dedicated hardware. Further, although the example programs are described with reference to the block diagram illustrated in FIG. 4, many other methods of implementing embodiments of the present disclosure may alternatively be used. For example, the order of execution of the blocks may be changed, and/or some of the blocks described may be changed, eliminated, or combined.

The site positioning system 12 is configured to operate in various site positioning modes responsive to the corresponding site positioning mode request signals 18 received from the machine controller 16 via the positioning controller 14. For instance, the machine controller 16 transmits the High Accuracy Machine Position mode request signal of the site positioning mode request signals 18 to the positioning controller 14 when the machine controller 16 determines that (a) the machine mode is in tram, load, or cut, (b) the underground machine 10 is transitioned to stop, and (c) the underground machine 10 is not being shut down or cut mode is complete (e.g. cut mode is completed to 100%). In response to receiving the High Accuracy Machine Position mode request signal, the positioning controller 14 operates in the High Accuracy Machine Position mode and controls the primary total station 26 to monitor both the first prism 20 and the second prism 22 and to transmit the first prism position and the second prism position to the positioning controller 14 via the multiplexer 24. With the first prism position and the second prism position, along with the roll and pitch data via the inclinometer 30, the positioning controller 14 determines the full positioning (e.g. x, y, z, roll, pitch, and yaw) of the underground machine 10. The positioning controller 14 transmits the corresponding full positioning data to the machine controller 16.

Furthermore, the machine controller 16 transmits the Low Accuracy Machine Position mode request signal of the site positioning mode request signals 18 to the positioning controller 14 when the machine controller 16 determines that (a) the machine mode is in tram, load, or cut, (b) the underground machine 10 is moving, and (c) Automatic Cut cycle is not active. In response to receiving the Low Accuracy Machine Position mode request signal, the positioning controller 14 operates in the Low Accuracy Machine Position mode and controls the primary total station 26 to monitor only one of the first prism 20 and the second prism 22 and to transmit the corresponding prism position of either the first prism 20 or the second prism 22 to the positioning controller 14 via the multiplexer 24. With only one of the first prism position or the second prism position, the positioning controller 14 determines the position (e.g. x, y, and z coordinates) of the underground machine 10. The positioning controller 14 transmits the corresponding position data to the machine controller 16.

Moreover, the machine controller 16 transmits the Reference Prism Measurement mode request signal of the site positioning mode request signals 18 to the positioning controller 14 when the machine controller 16 controls the underground machine 10 to begin operating in Automatic Cut cycle (e.g. Auto Cut OFF state transitions to Auto Cut ON state). In response to receiving the Reference Prism Measurement mode request signal, the positioning controller 14 operates in the Reference Prism Measurement mode and determines whether a reference prism measurement has been completed within a predetermined time period, for example 60 minutes, although it should be understood that the predetermined time period may be any other time period. If the positioning controller 14 determines that a reference prism measurement has not been completed within the predetermined time period, then the positioning controller 14 controls the primary total station 26 to monitor the reference prism 28 and to transmit the reference prism position to the positioning controller 14 via the multiplexer 24. On the other hand, if the positioning controller 14 determines that a reference prism measurement has been completed within the predetermined time period, then the positioning controller 14 will not make a reference prism measurement (e.g. will not monitor the reference prism). After the positioning controller 14 receives the reference prism position, the positioning controller 14 enters one of the High Accuracy Machine Position mode, the Low Accuracy Machine Position mode, and the OFF/Standby mode responsive to the corresponding site positioning mode request signals 18 received from the machine controller 16.

In addition, at startup of the underground machine 10, and without a request from the machine controller 16, the positioning controller 14 initially operates in the Reference Prism Measurement mode and controls the primary total station 26 to monitor the reference prism 28 and to transmit the reference prism position to the positioning controller 14 via the multiplexer 24. After the positioning controller 14 receives the reference prism position, the positioning controller 14 enters one of the High Accuracy Machine Position mode, the Low Accuracy Machine Position mode, and the OFF/Standby mode responsive to the corresponding site positioning mode request signals 18 received from the machine controller 16.

At all other times (e.g. when the machine controller 16 determines that the control operations of the underground machine 10 do not meet the conditions for transmitting the High Accuracy Machine Position mode request signal, the Low Accuracy Machine Position mode request signal, or the Reference Prism Measurement mode request signal of the site positioning mode request signals 18), the machine controller 16 transmits the OFF/Standby mode request signal to the positioning controller 14. In response to receiving the OFF/Standby mode request signal, the positioning controller 14 operates in the OFF/Standby mode and controls the primary total station 26 to refrain from monitoring any of the first prism 20, the second prism 22, and/or the reference prism 28.

In embodiments also including the secondary total station 34, responsive to receiving the High Accuracy Machine Position mode request signal from the machine controller 16, the positioning controller 14 operates in the High Accuracy Machine Position mode and controls the primary total station 26 to monitor the first prism 20 and to transmit the first prism position to the positioning controller 14 and, additionally, controls the secondary total station 34 to monitor the second prism 22 and to transmit the second prism position to the positioning controller 14. In such embodiments, the positioning controller 14 operates in the Reference Prism Measurement mode similarly to that described above. Moreover, in the event that the secondary total station 34 malfunctions, for example, the positioning controller 14 reverts back to responsively controlling the primary total station 26 in accordance to that which is described above in regards to embodiments including only the primary total station 26. Further, in some other examples, the primary total station 26 may malfunction, fail, or otherwise cease to adequately perform the desired monitoring tasks in conjunction with any of the first prism 20, the second prism 22, and/or the reference prism 28. In such examples, the secondary total station 34 may then act, functionally, as a primary, singular total station and the positioning controller 14 begins to responsively control the second total station 34, which is running now as a single primary total station, in accordance with the above-described embodiments that include only the primary total station 26

Figure 3:
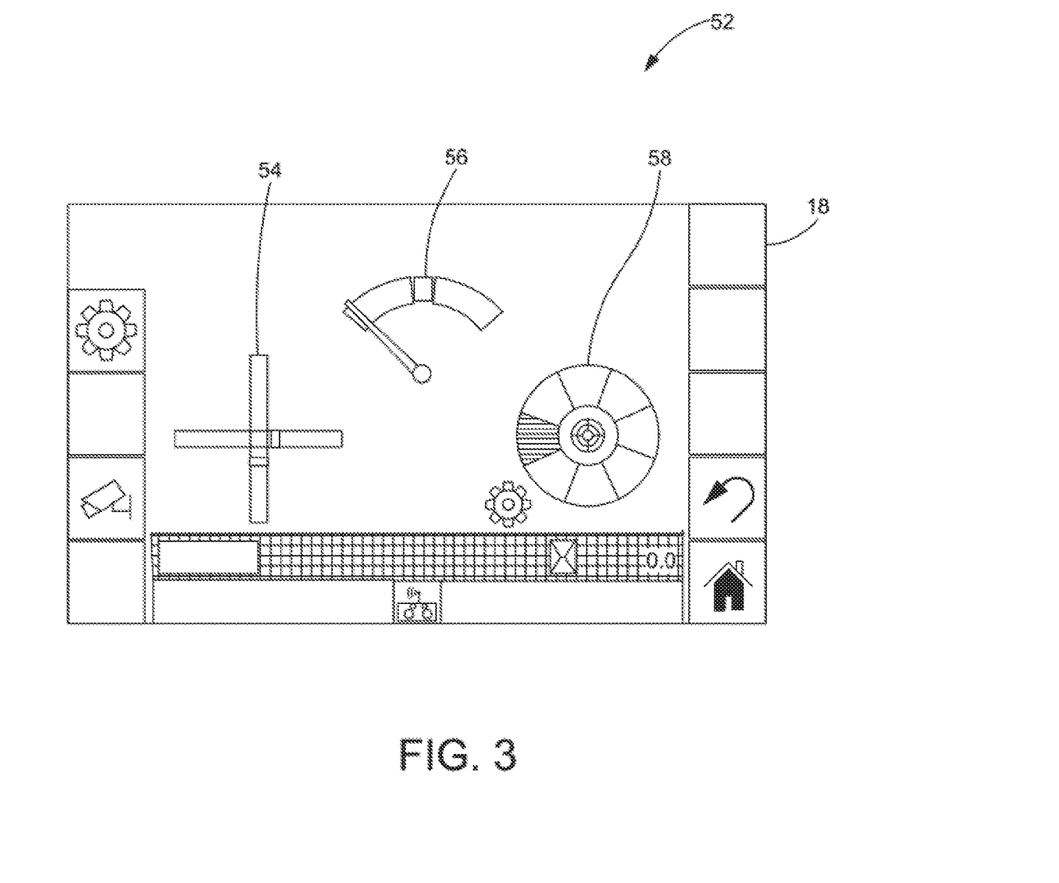
FIG. 3 is a pictorial illustration of an exemplary graphical user interface on a display, in accordance with an embodiment of the present disclosure.

The positioning controller 14 may further be configured to present positioning information (e.g. x, y, z, coordinates, roll, pitch, and yaw, among other things) for the machine 10 based on one or more of the first prism position, the second prism position, and the reference prism position, and any combinations thereof. To that end the positioning controller 14 may provide the positioning information for the machine 10 to a user, operator, observer, or any interested actor, via any data presentation device, such as, but not limited to, visual and/or audio output devices. For example, and with reference to FIG. 3, the positioning controller 14 provides a graphical user interface (GUI) 52 to the display 18. The positioning controller 14 is configured to present a machine position graphic 54, a machine yaw position graphic 56, and a cutter head position graphic 58 via the GUI 52. The machine position graphic 54 presents the positioning information, indicative of the position (e.g., x, y, and z coordinates) of the underground machine 10. The machine yaw position graphic 56 represents the yaw of the underground machine 10.

INDUSTRIAL APPLICABILITY

In general, the present disclosure may find applicability with underground machines for any number of industrial settings such as, but not limited to, underground mining and underground construction. As non-limiting examples, the underground machine 10 may be a tunneling machine or a cutting unit. By utilizing the systems and methods disclosed herein, the site positioning system 12 is implemented for positioning of the underground machine 10 at a worksite and may provide more accurate positioning thereof. Moreover, the site positioning system 12 may be utilized to control the primary total station 26 to selectively monitor the prisms, which may provide more efficient usage of the primary total station 26 and may lead to increased battery life thereof.

For example, during operation of the underground machine 10, the positioning controller 14 of the site positioning system 12 operates in OFF/Standby mode unless it receives the High Accuracy Machine Position mode request signal, the Low Accuracy Machine Position mode request signal, or the Reference Prism Measurement mode request signal from the machine controller 16. As such, the primary total station 26 is selectively controlled to monitor the first prism 20, the second prism 22, and the reference prism 28, either individually or in combinations of, instead of operating continuously as in some other systems. Moreover, in some instances, only data pertaining to the position (e.g. x, y, and z) of the underground machine 10 may be required such that the positioning controller 14 operates in the Low Accuracy Machine Position mode such that the primary total station 26 is controlled to monitor the first prism 20 only. In other instances, more accurate positioning data, such as the pose (e.g. x, y, z, and yaw), of the underground machine 10 may be required so that positioning controller 22 is requested to operate in the High Accuracy Machine Position mode to control the primary total station 26 to monitor both the first prism 20 and the second prism 22. In such a manner, the positioning system 12 may provide more efficient usage of the primary total station 26 as well as more accurate positioning of the underground machine 10.

Figure 4:
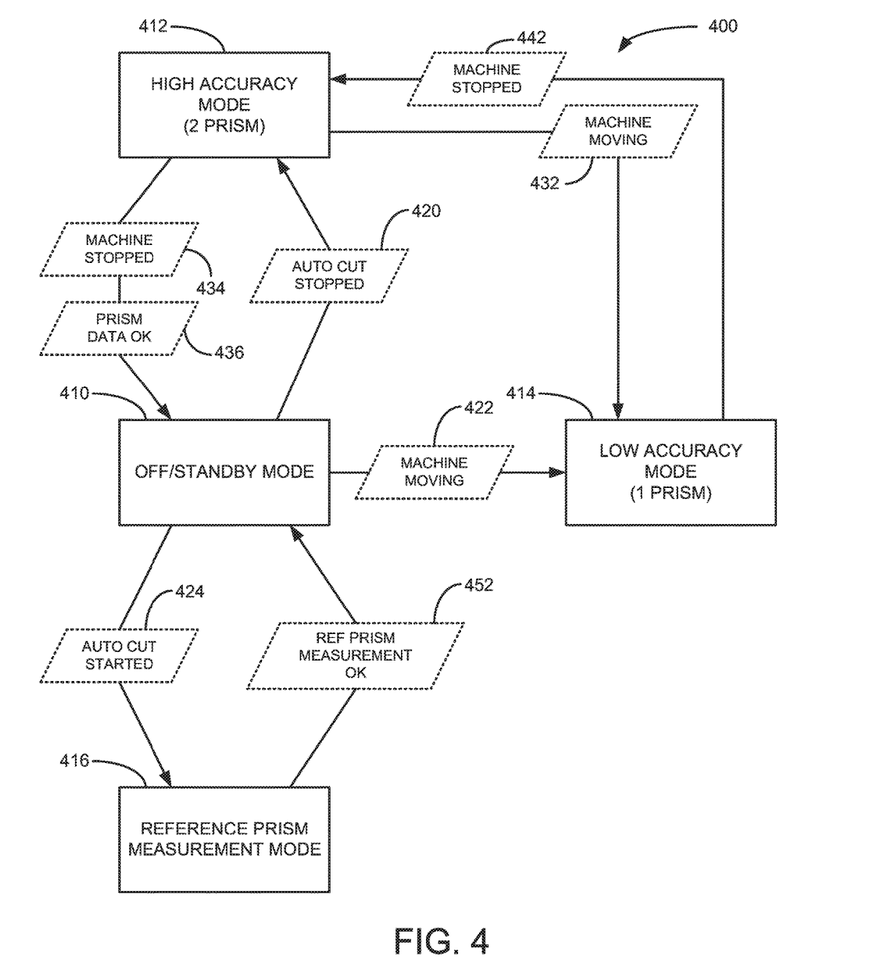
FIG. 4 is a block diagram illustrating a sample sequence which may be practiced in accordance with the teachings of the present disclosure.

To illustrate transitioning amongst the machine monitoring modes discussed above, FIG. 4 is a block diagram 400 of a sample mode selection logic which may be utilized to operate a site positioning system for an underground machine. Certain conditions and/or actions which may affect or trigger such mode selection, of the logic illustrated in block diagram 400, are depicted in FIG. 4 as dotted-line parallelogram blocks. Block 410 illustrates the positioning controller 14 in OFF/Standby mode. At block 410, if the machine controller 16 determines that the machine mode of the underground machine is in tram, load, or cut and the underground machine is not being shut down or the Automatic Cut cycle of the underground machine is complete, as depicted by the condition block 420, then the machine controller 16 transmits the High Accuracy Machine Position mode request signal to the positioning controller 14, as illustrated at block 412, such that the positioning controller 14 thereafter operates in the High Accuracy Machine Position mode. If the machine controller 16 determines, at block 410, that the machine mode of the underground machine is in tram, load, or cut, the underground machine is moving, as depicted by the condition block 422, and the Automatic Cut cycle of the underground machine is not active, then the machine controller 16 transmits the Low Accuracy Machine Position mode request signal to the positioning controller 14, as illustrated at block 414, such that the positioning controller 14 then operates in the Low Accuracy Machine Position mode. Moreover, at block 410, if the machine controller 14 determines that the underground machine 10 is beginning to operate in Automatic Cut cycle, as depicted by the condition block 424, the machine controller 16 transmits the Reference Prism Measurement request signal to the positioning controller 14, as illustrated at block 416, such that the positioning controller 14 operates in the Reference Prism Measurement mode.

The positioning controller 14 may transition amongst operating modes when operating in any of the discussed operating modes. For example, when operating in the High Accuracy Machine Position mode, embodied by block 412, the positioning controller 14 may transition to the Low Accuracy Machine Position mode, of block 414, if the machine 10 begins to move, as shown in the condition block 432. Additionally, the positioning controller 14 may transition from the Low Accuracy Machine Position mode of block 412 to the Off/Standby mode of block 410, if the machine 10 is stopped (condition block 434) and the positioning controller 14 determines that the prism data collected from the High Accuracy Machine Position mode is acceptable (condition block 436). Additionally, when the positioning controller 14 is operating in the Low Accuracy Machine Position Mode, of block 414, the positioning controller 14 may transition to the High Accuracy Machine Position mode, of block 412, if it is determined that the machine 10 is no longer moving, as depicted by the condition block 442. When operating in the Reference Prism Measuring mode, at block 416, if the positioning controller 14 determines that the reference prism measurements made, when operating in the Reference Prism Measuring mode, are acceptable (condition block 452), then the positioning controller 14 may transition to the Off/Standby mode of block 410.

In any of the aforementioned mode transitioning scenarios of the logic of the block diagram 400, after the positioning controller 14 receives the reference prism position, the machine controller 16 determines which one of the High Accuracy Machine Position mode request signal, the Low Accuracy Machine Position mode request signal, and the Reference Prism Measurement mode request signal should be transmitted to the positioning controller 14.

In any of the above described modes, the determined one or more of the first prism position, the second prism position, the reference prism position, and any combinations thereof, may be utilized to determine the positioning information for the machine 10. Such positioning information, as discussed above, may then be used by the positioning controller 14 to present such information to, for example, a user, an operator, and/or any other actor interested in the operations of the machine 10. Further, in some examples, it is contemplated that such positioning information may be used to subsequently control the machine 10, via any manual, semi-autonomous, and/or autonomous control systems associated with the machine 10.

What is claimed is:

1. A site positioning system for an underground machine, the site positioning system comprising:
   a first prism operatively coupled with the underground machine;
   a second prism operatively coupled with the underground machine;
   a primary total station in communication with the first prism and the second prism;
   a reference prism in communication with the primary total station;
   a positioning controller in communication with the primary total station, the positioning controller
   determining information regarding the underground machine, the information regarding the underground machine including information indicating whether a machine mode of the underground machine is in tram, load, or cut, information indicating whether the underground machine is transitioned to stop, and information indicating whether one of the underground machine is not being shut down or whether an Automatic Cut cycle of the underground machine is complete, based on the machine mode
   controlling the primary total station to monitor the first prism and the second prism and to transmit a first prism position and a second prism position, respectively, to the positioning controller in response to receiving a High Accuracy Machine Position mode request signal;
   controlling the primary total station to monitor the first prism and to transmit the first prism position to the positioning controller in response to receiving a Low Accuracy Machine Position mode request signal;
   determining whether a reference prism measurement has been completed within a predetermined time period in response to receiving a Reference Prism Measurement mode request signal; and presenting positioning information for the machine based on one or more of the request signals.

2. The site positioning system of claim 1, wherein the positioning controller is further configured to control, responsive to receiving an OFF/Standby mode request, the primary total station to refrain from monitoring the first prism and the second prism.

3. The site positioning system of claim 2, wherein the positioning controller is further configured to control, responsive to determining that the reference prism measurement has not been completed within the predetermined time period, the primary total station to monitor the reference prism and to transmit a reference prism position to the positioning controller.

4. The site positioning system of claim 2 wherein the positioning controller is further configured to control, responsive to determining that the reference prism measurement has been completed within the predetermined time period, the primary total station to refrain from monitoring the reference prism.

5. The site positioning system of claim 1 wherein the positioning controller is further configured to operate, responsive to receiving the reference prism measurement from the primary total station, in one of a High Accuracy Machine Position mode, a Low Accuracy Machine Position mode, or an OFF/Standby mode.

6. The site positioning system of claim 1 wherein the positioning controller is further configured to control, at startup of the underground machine, the primary total station to monitor the reference prism and transmit the reference prism measurement to the positioning controller.

7. The site positioning system of claim 6, wherein the reference prism is located off-board of the underground machine.

8. The site positioning system of claim 1, further including a secondary total station in communication with the first prism, the second prism, and the positioning controller.

9. An underground machine, comprising:
a first prism and a second prism operatively coupled with the machine;
a positioning controller operatively coupled with the machine, the positioning controller in communication with a primary total station located off-board of the underground machine, the primary total station in communication with the first prism and the second prism, the positioning controller configured to present positioning information for the machine based on one or more a first prism position, a second prism position, or a reference prism measurement;
a machine controller in communication with the positioning controller, the machine controller configured to:
determine information regarding the machine, the information regarding the machine including information indicating whether a machine mode of the underground machine is in tram, load, or cut, information indicating whether the machine is transitioned to stop, and information indicating whether one of the machine is not being shut down or whether an Automatic Cut cycle of the underground machine is complete,
transmit, if the information regarding the machine indicates that the machine mode of the underground machine is in tram, load, or cut and the underground machine is transitioned to stop, a High Accuracy Machine Position mode request signal to the positioning controller,
the High Accuracy Machine Position mode request signal being associated with the first prism position and the second prism position,
transmit, if the information regarding the machine indicates that the machine mode of the underground machine is in tram, load, or cut and the underground machine is moving, a Low Accuracy Machine Position mode request signal to the positioning controller,
the Low Accuracy Machine Position mode request signal being associated with the first prism position, and
transmit, if the information regarding the machine indicates that the underground machine is beginning to operate in the Automatic Cut cycle, a Reference Prism Measurement request signal to the positioning controller,
the Reference Prism Measurement request signal being associated with the reference prism measurement.

10. The machine of claim 9, wherein the positioning controller is configured to: control, responsive to receiving the High Accuracy Machine Position mode request signal, the primary total station to monitor the first prism and the second prism and to transmit the first prism position and the second prism position, respectively, to the positioning controller; control, responsive to receiving the Low Accuracy Machine Position mode request signal, the primary total station to monitor the first prism and to transmit the first prism position to the positioning controller; and determine, responsive to receiving the Reference Prism Measurement mode request signal, whether a reference prism measurement has been completed within a predetermined time period.

11. The machine of claim 10, wherein the positioning controller is further configured to control, responsive to receiving an OFF/Standby mode request from the machine controller, the primary total station to refrain from monitoring the first prism and the second prism.

12. The machine of claim 11, wherein the positioning controller is further configured to control, responsive to determining the reference prism measurement has not been completed within the predetermined time period, the primary total station to monitor the reference prism and to transmit the reference prism measurement to the positioning controller.

13. The machine of claim 11, wherein the positioning controller is further configured to control, responsive to determining the reference prism measurement has been completed within the predetermined time period, the primary total station to refrain from monitoring the reference prism.

14. The machine of claim 13, wherein the positioning controller is further configured to operate, responsive to receiving the reference prism measurement from the primary total station, in one of a High Accuracy Machine Position mode, a Low Accuracy Machine Position mode, and an OFF/Standby mode.

15. The machine of claim 14, wherein the positioning controller is further configured to control, at startup of the underground machine, the primary total station to monitor the reference prism and transmit the reference prism measurement to the positioning controller.

16. The machine of claim 15, wherein the reference prism is located off-board of the underground machine.

17. The machine of claim 16, further including a secondary total station in communication with the first prism, the second prism, and the positioning controller.

18. A method for operating a site positioning system for an underground machine, the method comprising:
- determining information regarding the machine, the information regarding the machine including information indicating whether a machine mode of the underground machine is in tram, load, or cut, information indicating whether the machine is transitioned to stop, and information indicating whether one of the machine is not being shut down or whether an Automatic Cut cycle of the underground machine is complete
- monitoring, if the information regarding the machine indicates that the machine mode of the underground machine is in tram, load, or cut and the underground machine is transitioned to stop, a first prism and a second prism of the underground machine for transmitting a first prism position and a second prism position, respectively, to a positioning controller of the site positioning system the first prism position and the second prism position being associated with a High Accuracy Machine Position mode request;
- monitoring, if the information regarding the machine indicates that the machine mode of the underground machine is in tram, load, or cut and the underground machine is moving, the first prism for transmitting the first prism position to the positioning controller, the first prism position being associated with a Low Accuracy Machine Position mode request;
- determining, if the information regarding the machine indicates that the underground machine is beginning to operate in the Automatic Cut cycle, whether a reference prism measurement has been completed within a predetermined time period, the reference prism measurement associated with a Reference Prism Measurement request signal; and
- presenting positioning information for the machine based on one or more of the first prism position, the second prism position, or the reference prism measurement.

19. The method of claim 18, wherein determining whether a reference prism measurement has been completed within a predetermined time period further includes monitoring, responsive to determining the reference prism measurement has not been completed within a predetermined time period, a reference prism of the site positioning system for transmitting a reference prism position to the positioning controller.

20. The method of claim 19, further including operating in an OFF/Standby mode responsive to receiving an OFF/Standby mode request from a machine controller such that monitoring of the first prism and the second prism is refrained.

\* \* \* \* \*